# 3,179,659
3-DESOXY-19-NOR-$\Delta^{1,3,5(10)}$-PREGNATRIENES AND PROCESSES FOR THEIR PREPARATION Albert Bowers and Otto Halpern, Mexico City, Mexico, assignors to Syntex Corporation, Panama, Panama, a corporation of Panama
No Drawing. Filed Aug. 14, 1963, Ser. No. 301,977
Claims priority, application Mexico, June 11, 1963, 72,519
19 Claims. (Cl. 260—239.55)

The present invention relates to certain novel cyclopentanoperhydrophenanthrene derivatives and to a method for the production thereof.

More particularly, it relates to the novel 3-desoxy-$\Delta^{1,3,5(10)}$-19-nor-derivatives of the pregnane series as well as the 6α-alkyl, alkenyl and alkinyl substituted derivatives, and to the method for making these compounds.

The novel compounds of the present invention are represented by the following formulas:

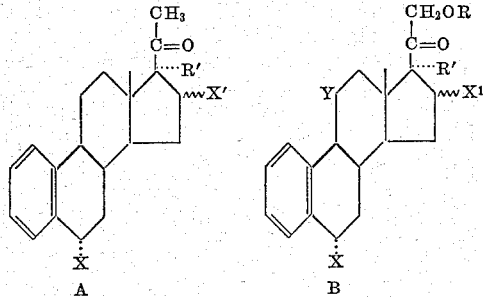

A           B

In the above formulas R represents hydrogen or an acyl radical of less than 12 carbon atoms; X represents hydrogen, a lower alkyl, alkenyl or alkinyl radical, $R^1$ represents hydrogen, hydroxy or an acyloxy radical of less than 12 carbon atoms; $X^1$ represents hydrogen, α-methyl, β-methyl, α-hydroxy or α-acyloxy; $X^1$ together with the hydroxyl group at C-17α represents the radical

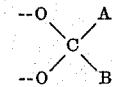

wherein A represents hydrogen or a lower alkyl radical and B represents lower alkyl, aryl or aralkyl radicals containing up to 10 carbon atoms and Y represents hydrogen, β-hydroxy or a keto group.

The acyl and acyloxy groups above referred to are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

These compounds are estrogenic type hormones showing anti-androgenic action and relatively low feminizing effect, they are especially useful in fertility control and treatment of menstrual and pregnancy disorders.

In our copending U.S. patent application Serial No. 301,999, filed August 14, 1963, there is described a method for preparing 3-desoxy-$\Delta^{1,3,5(10)}$-estratrienes from $\Delta^{1(10),5}$-19-nor-steroids, which comprises treatment of these compounds with a dehydrating agent, preferably with phosphorus oxychloride in a solvent inert to the reaction.

In the present application the reaction is applied to compounds of the pregnane series.

The method is illustrated by the following sequence of reactions:

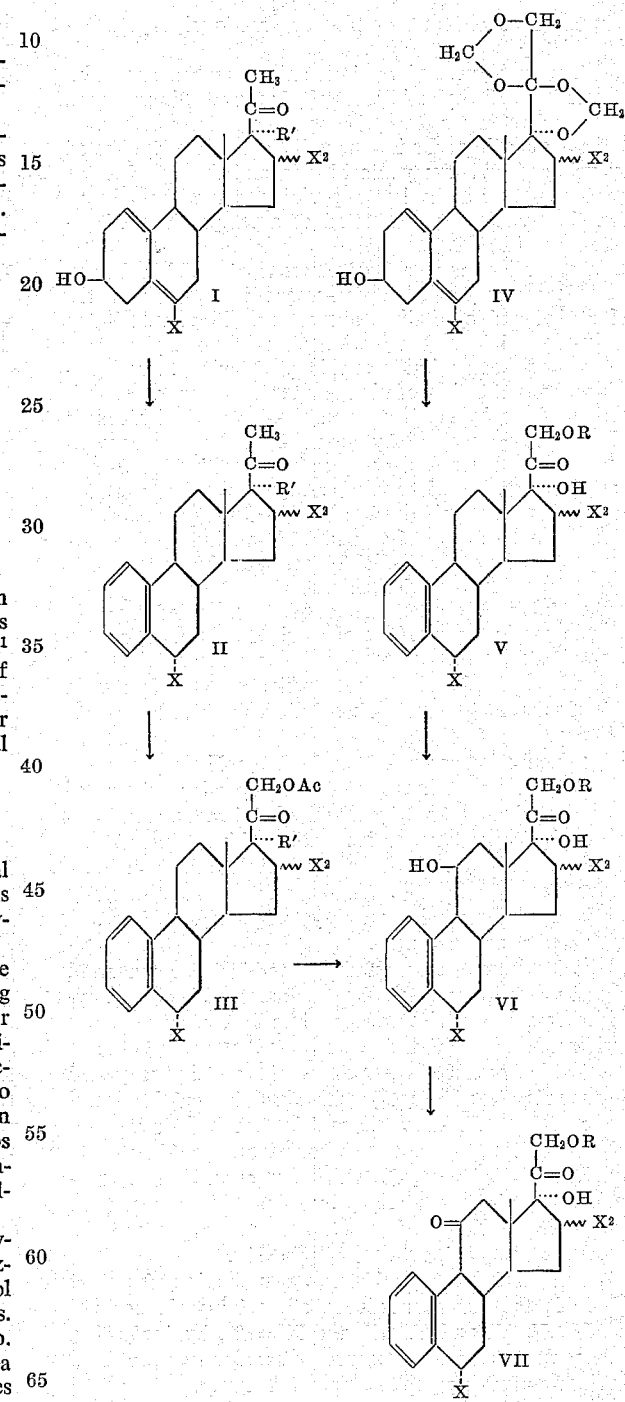

In the above equations R, $R^1$ and V have the same meaning as indicated heretofore and $X^2$ represents hydrogen, α-methyl or β-methyl.

In practicing the process illustrated above, the starting materials used are $\Delta^{1(10),5}$-19-nor-pregadien-3β-ol-20-one, $\Delta^{1(10),5}$-19-nor-pregnadiene - 3β,17α-diol-20-one, 17α-acyloxy-$\Delta^{1(10),5}$-19-nor-pregnadien-3β-ol-20 - one as well as the corresponding 16-methyl and/or 6-alkyl, alkenyl or alkinyl substituted derivatives (I), which are reacted with a dehydrating agent, preferably with phosphorus oxychloride in a solvent inert to the reaction, at a temperature of between 0° C. and reflux temperature, and for a period of time of between 10 minutes and 24 hours, to produce the corresponding 3-desoxy-$\Delta^{1,3,5(10)}$-19-nor-pregnatrienes (II). In the case of compounds substituted at C–6 by a hydrocarbon radical, there are obtained mixtures of 6α and 6β isomers, predominating the first ones, which are purified by conventional methods, such as chromatography or fractional crystallization.

Adequate solvents for this reaction are benzene, toluene, xylene, diethyl ether, tetrahydrofuran, dioxane, etc. in general there are preferably used nonpolar solvents.

The preceding reaction may be alternatively effected by using phosphorus pentachloride and thionyl chloride as reagents; with the latter, pyridine is used as solvent, and the reaction is conducted at a temperature of between 0 and 25° C.

In a similar manner, by treatment of 17,20;20,21-bismethylenedioxy-$\Delta^{1(10),5}$-19-nor-pregnadien-3β-ol and the 16-methyl and/or 6-alkyl, alkenyl or alkinyl substituted derivatives thereof (IV) with phosphorus oxychloride, phosphorus pentachloride or thionyl chloride, there is obtained aromatization of ring A with simultaneous elimination of the hydroxyl group at C–3. Upon hydrolysis of the bismethylenedioxy group by following conventional methods, preferably by refluxing with 60% formic acid for a period of time of between 30 minutes and 1 hour, there are obtained $\Delta^{1,3,5(10)}$-19-nor-pregnatriene-17α,21-diol-20-one, 16α and 16β-methyl-$\Delta^{1,3,5(10)}$-19-nor-pregnatriene-17α,21-diol-20-one and the corresponding C–6α substituted derivatives (V; R=H).

By treatment of the compounds represented by (II) with iodine in the presence of calcium oxide and in mixture of tetrahydrofuran-methanol, there are obtained the respective 21-iodo derivatives, which upon reflux with potassium acetate in acetone solution give rise to the 21-acetoxy compound (III).

By incubation of (III) and (V) with oxygenating microorganisms, such as for example by using cultures of *Curvularia lunata, Cunninghamella bainieri, Cunninghamella blakesleeana*, etc., or incubation with bovine adrenal glands, there are obtained the respective 11β-hydroxylated derivatives (VI; R=H). In the case of the 21-acetoxy compounds (III), it is necessary to hydrolyze this group prior to the incubation.

The 21-hydroxy compounds (V and VI) are converted into the respective esters by treatment with acid anhydrides or acid chlorides of less than 12 carbon atoms in pyridine solution (V and VI; R=acyl).

Oxidation of the 21-monoesters of the 11-hydroxylated compounds (VI; R=acyl) with chromic acid in glacial acetic acid, or 8 N-chromic acid in acetone solution and sulfuric medium, produce the corresponding 11-keto derivatives (VII; R=acyl), which are saponified by conventional methods, preferably by using a dilute potassium hydroxide solution, at low temperature, to produce the respective free compounds (VII; R=H).

An additional hydroxyl group may be introduced at C–16α in the compounds unsubstituted in said position (II, III, V, VI and VII; R and $X^2$=H), by incubation with a culture of *Streptomyces roseochromogenus* in a medium containing peptone and corn syrup.

The 16α,17α-dihydroxy compounds are converted into the corresponding 16,17-ketals or cyclic acetals by condensation with ketones or aldehydes such as acetone, acetaldehyde, dimethyl ketone, acetophenone, cyclohexanone and the like, in the presence of an acid catalyst, such as perchloric acid or p-toluenesulfonic acid.

Conventional esterification of the 16 and/or 16,17,21-hydroxylated compounds with acid anhydrides or acid chlorides of less than 12 carbon atoms in pyridine solution affords the respective 16-monoesters and/or 16,21-diesters.

The starting materials for the process object of our invention, i.e., the 3-hydroxy-$\Delta^{1(10),5}$-19-nor-pregnadienes are obtained by oxidation of the 3-acyloxy-20-ethylenedioxy or 3-acyloxy-17,20;20,21-bismethylenedioxy-19-hydroxy-$\Delta^5$-pregnenes with chromic acid in pyridine, for a prolonged period of time, to produce the $\Delta^{5(10)}$-6-keto-3-acyloxy-19-nor-compounds, which are reduced with lithium aluminum hydride or treated with a Grignard reagent, followed by acid treatment of the 3,6-dihydroxy compounds or the 6-alkyl, alkenyl or alkinyl substituted derivatives. The aforementioned starting materials have been described in our copending patent application Serial No. 293,831, filed July 9, 1963.

As examples of starting materials there are: $\Delta^{1(10),5}$-19-nor-pregnadien-3β-ol-20-one, 16α-methyl-$\Delta^{1(10),5}$-19-nor-pregnadien-3β-ol-20-one, $\Delta^{1(10),5}$-19 - nor - pregnadiene-3β,17α-diol-20-one, the 17-acetate of $\Delta^{1(10),5}$-19-nor-pregnadiene - 3β,17α - diol - 20 - one, 16α - methyl-$\Delta^{1(10),5}$ -19- nor - pregnadiene - 3β,17α - diol - 20 - one, 16β - methyl-$\Delta^{1(10),5}$-19-nor-pregnadiene-3β,17α-diol-20-one, 6-methyl-$\Delta^{1(10),5}$-19-nor - pregnadien-3β-ol-20-one, 6-vinyl-$\Delta^{1(10),5}$-19-nor-pregnadien-3β-ol-20-one, 6-ethinyl-$\Delta^{1(10),5}$-19-nor-pregnadien-3β-ol-20-one, 17,20;20,21-bismethylenedioxy-$\Delta^{1(10),5}$-19-nor-pregnadien-3β-ol, 16α-methyl-17,20;20,21-bismethylenedioxy-$\Delta^{1(10),5}$-19-nor-pregnadien - 3β - ol, 6-methyl - 17,20;20,21 - bismethylenedioxy-$\Delta^{1(10),5}$-19-nor-pregnadien-3β-ol, 6-vinyl-17,20;20,21-bismethylenedioxy-$\Delta^{1(10),5}$-19-nor-pregnadien - 3β - ol, 6-ethinyl-17,20;20,21-bismethylenedioxy - $\Delta^{1(10),5}$ - 19-nor-pregnadien-3β-ol and 6,16-dimethyl - 17,20;20,21 - bismethylenedioxy-$\Delta^{1(10),5}$-19-nor-pregnadien-3β-ol.

The following specific examples serve to illustrate but are not intended to limit the scope of the present invention:

PREPARATION

To a solution of 5 g. of 6-methyl-$\Delta^{1(10),5}$-19-nor-pregnadiene-3β,17α,21-triol-20-one in 200 cc. of chloroform there were added 40 cc. of a 37% aqueous formaldehyde solution and 5 cc. of concentrated hydrochloric acid and the mixture was stirred for 48 hours at room temperature. The two layers were separated, the aqueous layer was extracted with chloroform and the organic solutions combined and washed to neutral with water, dried over anhydrous sodium sulfate and evaporated to dryness. The residue was crystallized from methanol-ether thus producing 6 - methyl-17,20;20,21-bismethylenedioxy-$\Delta^{1(10),5}$-19-nor-pregnadien-3β-ol.

In a similar manner, 6-vinyl - $\Delta^{1(10),5}$ - 19-nor-pregnadiene-3β,17α,21-triol-20-one and 6-propargyl-$\Delta^{1(10),5}$-19-nor-pregnadiene-3β,17α,21-triol-20-one were converted respectively into 6-vinyl-17,20;20,21-bismethylenedioxy-$\Delta^{1(10),5}$-19-nor-pregnadien-3β-ol and 6-propargyl-17,20;20,21-bismethylenedioxy-$\Delta^{1(10),5}$-19-nor-pregnadien-3β-ol.

*Example I*

A solution of 2 g. of $\Delta^{1(10),5}$-19-nor-pregnadien-3β-ol-20-one in 200 cc. of anhydrous benzene and 20 cc. of phosphorus oxychloride was refluxed for 1½ hours under anhydrous conditions; the solution was cooled and carefully poured onto saturated sodium bicarbonate solution, the organic layer was separated and washed with water to neutral, dried over anhydrous sodium sulfate and evaporated to dryness under reduced pressure. The residue was crystallized from acetone-hexane to produce $\Delta^{1,3,5(10)}$-19-nor-pregnadien-20-one.

*Example II*

The preceding example was repeated but the reaction mixture was allowed to stand at room temperature for 24 hours, to produce also $\Delta^{1,3,5(10)}$-19-nor-pregnadien-20-one in similar yield.

*Example III*

A solution of 2 g. of $\Delta^{1(10),5}$-19-nor-pregnadien-3$\beta$-ol-20-one in 150 cc. of ether and 25 cc. of phosphorus oxychloride was then refluxed for 6 hours under anhydrous conditions. It was then cooled and washed with a saturated sodium bicarbonate solution and water to neutral, dried and evaporated to dryness. Crystallization of the residue from acetone-hexane gave $\Delta^{1,3,5(10)}$-19-nor pregnadien-20-one, identical to that obtained in the preceding examples.

*Example IV*

A solution of 2 g. of $\Delta^{1(10),5}$-19-nor-pregnadiene-3$\beta$,17$\alpha$-diol-20-one in 250 cc. of anhydrous benzene was treated with 20 cc. of phosphorus oxychloride and the mixture was heated at reflux temperature for 10 minutes; it was then poured into ice water and sodium bicarbonate solution was added. The organic layer was separated and washed with water to neutral, dried and evaporated to dryness. The residue was chromatographed on washed alumina, to give $\Delta^{1,3,5(10)}$-19-nor-pregnatrien-17$\alpha$-ol-20-one.

*Example V*

In accordance with the method described in Example I, 5 g. of 17,20;20,21-bismethylenedioxy-$\Delta^{1(10),5}$-19-nor-pregnadien-3$\beta$-ol were treated with phosphorus oxychloride in benzene solution to produce 17,20;20,21-bismethylenedioxy-$\Delta^{1,3,5(10)}$-19-nor-pregnatriene.

A mixture of 1 g. of this compound and 20 cc. of 60% formic acid was heated on the steam bath for 1 hour, cooled, diluted with water and the formed precipitate collected by filtration, washed with water, dried and recrystallized from acetone-hexane, thus producing $\Delta^{1,3,5(10)}$-19-nor-pregnatriene-17$\alpha$,21-diol-20-one.

In the same manner, starting from 16$\alpha$-methyl-17,20;20,21 - bismethylenedioxy - $\Delta^{1(10),5}$ - 19 - nor - pregnadien-3$\beta$-ol there was obtained 16$\alpha$-methyl-$\Delta^{1,3,5(10)}$-19-pregnatriene-17$\alpha$,21-diol-20-one as final product.

*Example VI*

A solution of 1 g. of 17,20;20,21-bismethylenedioxy-$\Delta^{1(10),5}$-19-nor-pregnadien-3$\beta$-ol- in 7 cc. of anhydrous pyridine was cooled to 0° C., treated with 1 cc. of thionyl chloride and the reaction mixture was kept at room temperature overnight. Ice water was added and the product extracted with methylene chloride. The organic extract was washed with dilute hydrochloric acid, water, sodium bicarbonate solution and water to neutral, dried over anhydrous sodium sulfate and evaporated to dryness. The residue was purified by chromatography on washed alumina, to produce 17,20;20,21-bismethylenedioxy-$\Delta^{1,3,5(10)}$-19-nor-pregnatriene, identical to that obtained in the preceding example.

*Example VII*

In the method of Example I, benzene was substituted by toluene, to produce also $\Delta^{1,3,5(10)}$-19-nor-pregnatrien-20-one in similar yield.

*Example VIII*

In accordance with the method described in the foregoing example, 5 g. of 6-methyl-$\Delta^{1(10),5}$-19-nor-pregnadien-3$\beta$-ol-20-one were treated with phosphorus oxychloride in toluene solution, and the product obtained was purified by chromatography on washed alumina, to produce 6$\alpha$-methyl-$\Delta^{1,3,5(10)}$-19-nor-pregnatrien-20-one in pure form.

*Example IX*

In accordance with the method described in Example I, the compounds below mentioned (I) were converted into the corresponding ring A aromatic derivatives (II). The compounds substituted at C-6 were purified by chromatography on washed alumina:

| I | II |
|---|---|
| 16$\alpha$-methyl-$\Delta^{1(10),5}$-19-nor-pregnadien-3$\beta$-ol-20-one. | 16$\alpha$-methyl-$\Delta^{1,3,5(10)}$-19-nor-pregnatrien-20-one. |
| 16$\beta$-methyl-$\Delta^{1(10),5}$-19-nor-pregnadien-3-ol-20-one. | 16$\beta$-methyl-$\Delta^{1,3,5(10)}$-19-nor-pregnatrien-20-one. |
| 16$\alpha$,17$\alpha$-isopropylidenedioxy-$\Delta^{1(10),5}$-19-nor-pregnadien-3$\beta$-ol-20-one. | 16$\alpha$,17$\alpha$-isopropylidenedioxy-$\Delta^{1,3,5(10)}$-19-nor-pregnatrien-20-one. |
| 6-vinyl-$\Delta^{1(10),5}$-19-nor-pregnadien-3$\beta$-ol-20-one. | 6$\alpha$-vinyl-$\Delta^{1,3,5(10)}$-19-nor-pregnatrien-20-one. |
| 6-ethyl-$\Delta^{1(10),5}$-19-nor-pregnadien-3$\beta$-ol-20-one. | 6$\alpha$-ethyl-$\Delta^{1,3,5(10)}$-19-nor-pregnatrien-20-one. |
| 6-ethinyl-$\Delta^{1(10),5}$-19-nor-pregnadien-3$\beta$-ol-20-one. | 6$\alpha$-ethinyl-$\Delta^{1,3,5(10)}$-19-nor-pregnatrien-20-one. |
| 6-propargyl-$\Delta^{1(10),5}$-19-nor-pregnadien-3$\beta$-ol-20-one. | 6$\alpha$-propargyl-$\Delta^{1,3,5(10)}$-19-nor-pregnatrien-20-one. |
| 17-monoacetate of $\Delta^{1(10),5}$-19-nor-pregadiene-3$\beta$,17$\alpha$-diol-20-one. | 17-acetate of $\Delta^{1,3,5(10)}$-19-nor-pregnatrien-17$\alpha$-ol-20-one. |
| 6,16$\alpha$-dimethyl-$\Delta^{1(10),5}$-19-nor-pregnadien-3$\beta$-ol-20-one. | 6$\alpha$,16$\beta$-dimethyl-$\Delta^{1,3,5(10)}$-19-nor-pregnatrien-20-one. |
| 16$\alpha$-methyl-6-ethinyl-$\Delta^{1(10),5}$-19-nor-pregnadien-3$\beta$-ol-20-one. | 16$\alpha$-methyl-6$\alpha$-ethinyl-$\Delta^{1,3,5(10)}$-19-nor-pregnatrien-20-one. |
| 6,16$\beta$-dimethyl-$\Delta^{1(10),5}$-19-nor-pregnadien-3$\beta$-ol-20-one. | 6$\alpha$,16$\beta$-dimethyl-$\Delta^{1,3,5(10)}$-19-nor-pregnatrien-20-one. |
| 6-vinyl-16$\alpha$-methyl-$\Delta^{1(10),5}$-19-nor-pregnadien-3$\beta$-ol-20-one. | 6$\alpha$-vinyl-16$\alpha$-methyl-$\Delta^{1,3,5(10)}$-19-nor-pregnatrien-20-one. |
| 6-propargyl-16$\alpha$-methyl-$\Delta^{1(10),5}$-19-nor-pregnadien-3$\beta$-ol-20-one. | 6$\alpha$-propargyl-16$\alpha$-methyl-$\Delta^{1,3,5(10)}$-19-nor-pregnatrien-20-one. |
| 17,20;20,21-bismethylenedioxy-6-methyl-$\Delta^{1(10),5}$-19-nor-pregnadien-3$\beta$-ol. | 17,20;20,21-bismethylenedioxy-6$\alpha$-methyl-$\Delta^{1,3,5(10)}$-19-nor-pregnatriene. |
| 17,20;20,21-bismethylenedioxy-6-vinyl-$\Delta^{1(10),5}$-19-nor-pregnadien-3$\beta$-ol. | 17,20;20,21-bismethylenedioxy-6$\alpha$-vinyl-$\Delta^{1,3,5(10)}$-19-nor-pregnatriene. |
| 17,20;20,21-bismethylenedioxy-6-propargyl-$\Delta^{1(10),5}$-19-nor-pregnadien-3$\beta$-ol. | 17,20;20,21-bismethylenedioxy-6$\alpha$-propargyl-$\Delta^{1,3,5(10)}$-19-nor-pregnatriene. |
| 17,20;20,21-bismethylenedioxy-6-ethinyl-$\Delta^{1(10),5}$-19-nor-pregnadien-3$\beta$-ol. | 17,20;20,21-bismethylenedioxy-6$\alpha$-ethinyl-$\Delta^{1,3,5(10)}$-19-nor-pregnatriene. |

*Example X*

Example IV was repeated but using as starting material 16$\alpha$ - methyl - $\Delta^{1(10),5}$ - 19 - nor - pregnadiene - 3$\beta$,17$\alpha$-diol-20-one, thus yielding 16$\alpha$-methyl-$\Delta^{1,3,5(10)}$-19-nor-pregnatrien-17$\alpha$-ol-2-one.

To a solution of 2 g. of the foregoing compound in 40 cc. of anhydrous benzene there were added 200 mg. of p-toluenesulfonic acid and 5 cc. of acetic anhydride and the mixture was allowed to stand for 24 hours at room temperature poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 16$\alpha$-methyl-$\Delta^{1,3,5(10)}$-19-nor-pregnatrien-17$\alpha$-ol-20-one.

*Example XI*

In accordance with the hydrolysis method described in Example V, 17,20;20,21-bismethylenedioxy-6$\alpha$-methyl-$\Delta^{1,3,5(10)}$-19-nor-pregnatriene, 17,20;20,21-bismethylenedioxy-6$\alpha$-vinyl-$\Delta^{1,3,5(10)}$-19-nor-pregnatriene, 17,20;20,21-bismethylenedioxy - 6$\alpha$ - ethinyl-$\Delta^{1,3,5,(10)}$-19-nor-pregnatriene and 17,20;20,21-bismethylenedioxy-6$\alpha$-propargyl-$\Delta^{1,3,5(10)}$-19-nor-pregnatriene were treated with 60% formic acid, to produce respectively; 6$\alpha$-methyl-$^{1,3,5(10)}$-19-nor-pregnatrien-17$\alpha$,21-diol-20-one, 6$\alpha$-vinyl-$\Delta^{1,3,5(10)}$-19-nor-pregnatrien-17$\alpha$,21-diol-20-one, 6$\alpha$ - ethinyl-$\Delta^{1,3,5(10)}$-

19 - nor - pregnatrien-17α,21-diol-20-one and 6α-propargyl-Δ$^{1,3,5(10)}$-19-nor-pregnatrien-17α,21-diol-20-one.

Example XII

A stain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | |
|---|---|
| Glucose | g-- 20 |
| (NH$_4$)$_2$HPO$_4$ | g-- 5 |
| or NaNO$_3$ | g-- 3 |
| K$_2$HPO$_4$ | g-- 1 |
| MgSO$_4$.7H$_2$O | g-- 0.2 |
| KCl | g-- 0.5 |
| ZnSO$_4$ | Traces |
| FeSO$_4$.7H$_2$O | Traces |
| Distilled water to complete 1 lt. | |

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of Δ$^{1,3,5(10)}$-19-nor-pregnatriene-17α,21-diol-20-one in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted with methylene chloride ether (9:1) to produce Δ$^{1,3,5(10)}$-19-nor-pregnatriene-11β,17α,21-triol-20-one.

In the same manner, starting from the corresponding 11-desoxy compounds, there were obtained: 6α-methyl-Δ$^{1,3,5(10)}$ - 19 - nor-pregnatriene-11β,17α,21-triol-20-one, 6α - vinyl - Δ$^{1,3,5(10)}$-19-nor-pregnatriene-11β,17α,21-triol-20-one, 6α-ethinyl-Δ$^{1,3,5(10)}$-19-nor-pregnatriene-11β,17α, 21-triol-20-one, and 16α-methyl-Δ$^{1,3,5(10)}$-19-nor-pregnatriene-11β,17α,21-triol-20-one.

Example XIII

A culture of *Streptomyces roseochromogenus* ATCC 3347 was prepared in an inclined agar medium containing 1% of glucose and 1% of yeast extract, 1 cc. of a suspension of this culture was then used to innoculate each of a series of 250 cc. flasks containing 50 cc. of a sterilized aqueous medium of 2% peptone and 5% corn syrup, the mixtures were then incubated in a shaking machine at 28° C. under aeration for a period of 24–48 hours. There was thus obtained a vegetating growing culture of *Streptomyces roseochromogenus* which was used for the subsequent incubation of the steriod.

10 mg. of Δ$^{1,3,5(10)}$-19-nor-pregnatriene-11β,17α,21-triol-20-one were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving Δ$^{1,3,5(10)}$-19-nor-pregnatriene-11β,16α,17α, 21-tetrol-20-one.

A mixture of 200 mg. of the foregoing compound, 1 cc. of pyridine and 1 cc. of acetic anhydride was kept at room temperature overnight, poured into water and the formed precipitate collected by filtration, to produce 16, 21-diacetate of Δ$^{1,3,5(10)}$-19-nor-pregnatriene-11β,16α,17α, 21-tetrol-20-one.

Example XIV

In accordance to the method described in Example IV, 6 - methyl-Δ$^{1(10),5}$-19-nor-pregnadiene-3β,17α-diol-20-one, 6,16α - dimethyl-Δ$^{1(10),5}$-19-nor-pregnadiene-3β,17α-diol-20-one and 6-vinyl-16α-methyl-Δ$^{1(10),5}$-19-nor-pregnadiene-3β,17α-diol-20-one were treated with phosphorus oxychloride in benzene, and the products obtained were purified by chromatography on washed alumina thus affording 6α-methyl-Δ$^{1,3,5(10)}$-19-nor-pregnatrien-17α-ol-20-one, 6α,16α - dimethyl-Δ$^{1,3,5(10)}$-19-nor-pregnatrien-17α-ol-20-one and 6α-vinyl-16α-methyl-Δ$^{1,3,5(10)}$-19-nor-pregnatrien-17α-ol-20-one.

The foregoing compounds were esterified with propionic, caproic and cyclopentylpropionic anhydrides, by following the method of Example X, to produce the respective esters.

Example XV

A mixture of 500 mg. of Δ$^{1,3,5(10)}$-19-nor-pregnatriene-11β,17α,21-triol-20-one, 2 cc. of pyridine and 2 cc. of acetic anhydride was kept at room temperature for 4 hours, poured into water and the formed precipitate collected by filtration, to produce the 21-monoacetate of Δ$^{1,3,5(10)}$-19-nor-pregnatriene-11β,17α,21-triol-20-one.

In the same manner, starting from Δ$^{1,3,5(10)}$-19-nor-pregnatriene-17α,21-diol-20-one, 16α-methyl-Δ$^{1,3,5(10)}$-19-nor - pregnatriene - 17α,21 - diol - 20 - one, 16α - methyl-Δ$^{1,3,5(10)}$-19-nor-pregnatriene-11β,17α,21-triol-20-one, 6α-methyl-Δ$^{1,3,5(10)}$-19-nor - pregnatriene - 11β,17α,21 - triol-20-one and 6α-ethinyl-Δ$^{1,3,5(10)}$-19-nor-pregnatriene-11β, 17α,21-triol-20-one there were obtained the respective 21-monoacetates.

Example XVI

A solution of 1 g. of the 21-monoacetate of Δ$^{1,3,5(10)}$-19-nor-pregnatriene-11β,17α,21-triol-20-one in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording the 21-monoacetate of Δ$^{1,3,5(10)}$-19-nor-pregnatriene-17α,21 - diol-11,20-dione.

A mixture of 800 mg. of the preceding compound, 20 cc. of methanol and 2 cc. of a 5% aqueous potassium hydroxide solution was stirred at 0° C. for 1 hour under nitrogen atmosphere. It was then diluted with water and the formed precipitate collected by filtration, to produce Δ$^{1,3,5(10)}$-19-nor-pregnatriene - 17α,21 - diol-11,20-dione.

Example XVII

In accordance with the method described in the preceding example, the compounds below mentioned (I) were oxidized with 8 N-chromic acid in acetone, and then saponified with potassium hydroxide in methanol, to produce the corresponding 11-keto derivatives (II):

| I | II |
|---|---|
| 21-monoacetate of 16α-methyl-Δ$^{1,3,5(10)}$-19-nor-pregnatriene-11β,17α,21-triol-20-one. | 16α-methyl-Δ$^{1,3,5(10)}$-19-nor-pregnatriene-17α,21-diol-11,20-dione. |
| 21-monoacetate of 6α-methyl-Δ$^{1,3,5(10)}$-19-nor-pregnatriene-11β,17α,21-triol-20-one. | 6α-methyl-Δ$^{1,3,5(10)}$-19-nor-pregnatriene-17α,21-diol-11,20-dione. |
| 21-monoacetate of 6α-ethinyl-Δ$^{1,3,5(10)}$-19-nor-pregnatriene-11β,17α,21-triol-20-one. | 6α-ethinyl-Δ$^{1,3,5(10)}$-19-nor-pregnatriene-17α,21-diol-11,20-dione. |

Example XVIII

A cooled solution of 4 g. of $\Delta^{1,3,5(10)}$-19-nor-pregnatrien-17α-ol-20-one in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-$\Delta^{1,3,5(10)}$-19-nor-pregnatrien-17α-ol-20-one.

This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding the 21-monoacetate of $\Delta^{1,3,5(10)}$-19-nor-pregnatriene-17α,21-diol-20-one, identical to that obtained in Example XV.

Example XIX

The preceding example was repeated but using $\Delta^{1,3,5(10)}$-19-nor-pregnatrien-20-one as starting material, thus producing the acetate of $\Delta^{1,3,5(10)}$-19-nor-pregnatrien-21-ol-20-one.

The foregoing compound was saponified with potassium hydroxide in methanol, and the $\Delta^{1,3,5(10)}$-19-nor-pregnatrien-21-ol-20-one thus obtained was incubated with a culture of *Curvularia lunata* ATCC 13935, to produce $\Delta^{1,3,5(10)}$-19-nor-pregnatriene-11β,21-diol-20-one.

Example XX

In accordance with the method described in Example XVIII, 5 g. of 6α,16α-dimethyl-$\Delta^{1,3,5(10)}$-19-nor-pregnatrien-17α-ol-20-one were converted into the 21-monoacetate of 6α,16α-dimethyl-$\Delta^{1,3,5(10)}$-19-nor-pregnatriene-17α,21-diol-20-one. Upon incubation of the foregoing compound with *Curvularia lunata* ATCC 13935, previous saponification of the acetoxy group at C-21, there was obtained 6α,16α-dimethyl-$\Delta^{1,3,5(10)}$-19-nor-pregnatriene-11β,17α-21-triol-20-one.

Example XXI

By following the method described in Example XIII, the compounds below mentioned (I) were incubated with a culture of *Streptomyces roseochromogenus*, to produce the respective 16α-hydroxy compounds (II):

| I | II |
|---|---|
| 6α-methyl-$\Delta^{1,3,5(10)}$-19-nor-pregnatriene-11β,17α,21-triol-20-one. | 6α-methyl-$\Delta^{1,3,5(10)}$-19-nor-pregnatriene-11β-16α,17α,21-tetrol-20-one. |
| 6α-vinyl-$\Delta^{1,3,5(10)}$-19-nor-pregnatriene-11β,17α,21-triol-20-one. | 6α-vinyl-$\Delta^{1,3,5(10)}$-19-nor-pregnatriene-11β,16α,17α,21-tetrol-20-one. |
| $\Delta^{1,3,5(10)}$-19-nor-pregnatriene-17α,21-diol-20-one. | $\Delta^{1,3,5(10)}$-19-nor-pregnatriene-16α,17α,21-triol-20-one. |
| 6α-methyl-$\Delta^{1,3,5(10)}$-19-nor-pregnatriene-17α,21-diol-11,20-dione. | 6α-methyl-$\Delta^{1,3,5(10)}$-19-nor-pregnatriene-16α,17α,21-triol-11,20-dione. |
| $\Delta^{1,3,5(10)}$-19-nor-pregnatrien-17α-ol-20-one. | $\Delta^{1,3,5(10)}$-19-nor-pregnatriene-16α,17α-diol-20-one. |

Example XXII

In accordance with the esterification method described in Example XIII, the compounds under I were treated with the indicated acid anhydride, to give the respective esters (II):

| I | Anhydride | II |
|---|---|---|
| $\Delta^{1,3,5(10)}$-19-nor-pregnatriene-11β,17α,21-triol-20-one. | Propionic | 21-propionate of $\Delta^{1,3,5(10)}$-19-nor-pregnatriene-11β,17α,21-triol-20-one. |
| 6α-methyl-$\Delta^{1,3,5(10)}$-19-nor-pregnatriene-11β,17α,21-triol-20-one. | Caproic | 21-caproate of 6α-methyl-$\Delta^{1,3,5(10)}$-19-nor-pregnatriene-11β,17α,21-triol-20-one. |
| 6α-vinyl-$\Delta^{1,3,5(10)}$-19-nor-pregnatriene-17α,21-diol-20-one. | Enanthic | 21-enanthate of 6α-vinyl-$\Delta^{1,3,5(10)}$-19-nor-pregnatriene-17α,21-diol-20-one. |
| 16α-methyl-$\Delta^{1,3,5(10)}$-19-nor-pregnatriene-17α,21-diol-11,20-dione. | Cyclopentylpropionic. | 21-cyclopentylpropionate of 16α-methyl-$\Delta^{1,3,5(10)}$-19-nor-pregnatriene-17α,21-diol-11,20-dione. |
| 6α-ethinyl-$\Delta^{1,3,5(10)}$-19-nor-pregnatriene-17α,21-diol-11,20-dione. | Undecenoic | 21-undecenoate of 6α-ethinyl-$\Delta^{1,3,5(10)}$-19-nor-pregnatriene-17α,21-diol-11,20-dione. |
| 6α,16α-dimethyl-$\Delta^{1,3,5(10)}$-19-nor-pregnatriene-11β,17α,21-triol-20-one. | Propionic | 21-propionate of 6α,16α-dimethyl-$\Delta^{1,3,5(10)}$-19-nor-pregnatriene-11β,17α,21-triol-20-one. |
| 6α-methyl-$\Delta^{1,3,5(10)}$-19-nor-pregnatriene-11β,16α,17α,21-tetrol-20-one. | Acetic | 16,21-diacetate of 6α-methyl-$\Delta^{1,3,5(10)}$-19-nor-pregnatriene-11β,16α,17α,21-tetrol-20-one. |
| $\Delta^{1,3,5(10)}$-19-nor-pregnatriene-16α,17α,21-triol-20-one. | Cyclopentylpropionic. | 16,21-dicyclopentylpropionate of $\Delta^{1,3,5(10)}$-19-nor-pregnatriene-16α,17α,21-triol-20-one. |
| $\Delta^{1,3,5(10)}$-19-nor-pregnatriene-16α,17α-diol-20-one. | Caproic | 16-caproate of $\Delta^{1,3,5(10)}$-19-nor-pregnatriene-16α,17α-diol-20-one. |

Example XXIII

To a mixture of 1 g. of $\Delta^{1,3,5(10)}$-19-nor-pregnatriene-11β,16α,17α,21-tetrol-20-one and 75 cc. of acetone there were added 30 drops of 72% perchloric acid. After 1 hour at room temperature 30 drops of pyridine were added and the resulting solution was evaporated to dryness under reduced pressure. Water was added to the residue and it was then extracted several times with ethyl acetate. The combined extracts were washed to neutrality with water, dried over sodium sulfate and evaporated to dryness. The residue was crystallized from methanol, to produce 16α,17α - isopropylidenedioxy - $\Delta^{1,3,5(10)}$-19-nor-pregnatriene-11β,21-diol-20-one.

By the same method 6α-methyl-$\Delta^{1,3,5(10)}$-19-nor-pregnatriene - 16α,17α,21 - triol - 11,20 - dione and 6α - methyl-$\Delta^{1,3,5(10)}$-19-nor-pregnatriene-11β,16α,17α,21-tetrol-20-one were converted respectively into 16α,17α-isopropylidenedioxy - 6α - methyl-$\Delta^{1,3,5(10)}$-19-nor-pregnatrien-21-ol-11,20 - dione and 16α,17α-isopropylidenedioxy-6α-methyl-$\Delta^{1,3,5(10)}$-19-nor-pregnatriene-11β,21-diol-20-one.

Example XXIV

A solution of 1 g. of $\Delta^{1,3,5(10)}$-19-nor-pregnatriene-16α,17α,21-triol-20-one in 20 cc. of chloroform was treated with 5 g. of acetaldehyde and 10 drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutrol alumina, thus yielding the 16,17-acetaldehydo acetal of $\Delta^{1,3,5(10)}$-19-nor-pregnatriene-16α,17α,21-triol-20-one.

Example XXV

A solution of 1 g. of $\Delta^{1,3,5(10)}$-19-nor-pregnatriene-11β,16α,17α,21-tetrol-20-one in 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of $\Delta^{1,3,5(10)}$-19-nor-pregnatriene-11β,16α,17α,21-tetrol-20-one.

In the same manner, starting from $\Delta^{1,3,5(10)}$-19-nor-pregnatriene-16α,17α-diol-20-one there was obtained the corresponding acetophenonide.

Example XXVI

By following the method described in Example XIII, 500 mg. of 16α,17α-isopropylidenedioxy-$\Delta^{1,3,5(10)}$-19-nor-pregnatriene-11β,21-diol-20-one were esterified with acetic anhydride in pyridine and the 21-monoacetate thus obtained was oxidized with an 8 N solution of chromic acid in acetone, to produce the acetate of 16α,17α-isopropylidenedioxy-$\Delta^{1,3,5(10)}$-19-nor-pregnatrien-21-ol-11,20-dione.

Example XXVII

In accordance with the esterification method of Example X, 500 mg. of 16α-methyl-$\Delta^{1,3,5(10)}$-19-nor-pregnatriene-17α,21-diol-11,20-dione were treated with acetic anhydride in benzene solution and in the presence of p-toluenesulfonic acid, to produce the 17,21-diacetate of 16α-methyl-$\Delta^{1,3,5(10)}$-19-nor-pregnatriene-17α,21-diol-11,20-dione.

We claim:

1. A compound of the following formula:

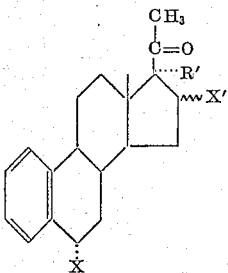

wherein X is selected from the group consisting of hydrogen, lower alkyl, lower alkenyl and lower alkinyl; $R^1$ is selected from the group consisting of hydrogen, hydroxyl and an acyloxy radical of less than 12 carbon atoms; $X^1$ is selected from the group consisting of hydrogen, α-methyl, β-methyl, α-hydroxy and an α-acyloxy radical of less than 12 carbons atoms; $R^1$ and $X^1$ together represent the grouping

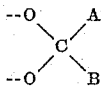

wherein A is selected from the group consisting of hydrogen and a lower alkyl radical and B is selected from the group consisting of lower alkyl, aryl and aralkyl containing up to 10 carbon atoms.

2. $\Delta^{1,3,5(10)}$-19-nor-pregnatrien-20-one.
3. 6α-methyl-$\Delta^{1,3,5(10)}$-19-nor-pregnatrien-20-one.
4. 6α-vinyl-$\Delta^{1,3,5(10)}$-19-nor-pregnatrien-20-one.
5. 6α-ethinyl-$\Delta^{1,3,5(10)}$-19-nor-pregnatrien-20-one.
6. 16α-methyl-$\Delta^{1,3,5(10)}$-19-nor pregnatrien-20-one.
7. $\Delta^{1,3,5(10)}$-19-nor-pregnatrien-17α-ol-20-one.
8. 16α-methyl-$\Delta^{1,3,5(10)}$-19-nor-pregnatrien-17α-ol-20-one.
9. 16α,17α-isopropylidenedioxy-$\Delta^{1,3,5(10)}$-19-nor-pregnatrien-20-one.
10. 6α,16α-dimethyl-$\Delta^{1,3,5(10)}$-19-nor-pregnatrien-17α-ol-20-one.

11. A compound of the following formula:

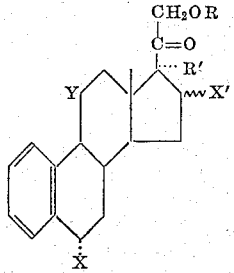

wherein X is selected from the group consisting of hydrogen, lower alkyl, lower alkenyl and lower alkinyl; $R^1$ is selected from the group consisting of hydrogen, hydroxyl and an acyloxy radical of less than 12 carbon atoms; $X^1$ is selected from the group consisting of hydrogen, α-methyl, β-methyl, α-hydroxy and an α-acyloxy radical of less than 12 carbon atoms; $R^1$ and $X^1$ together represent the grouping

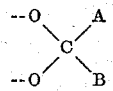

wherein A is selected from the group consisting of hydrogen and a lower alkyl radical and B is selected from the group consisting of lower alkyl, aryl and aralkyl containing up to 10 carbon atoms, R is selected from the group consisting of hydrogen and an acyl radical of less than 12 carbon atoms and Y is selected from the group consisting of hydrogen, β-hydroxy and keto.

12. $\Delta^{1,3,5(10)}$-19-nor-pregnatriene-17α,21-diol-20-one.
13. $\Delta^{1,3,5(10)}$-19-nor-pregnatriene-11β-17α,21-triol-20-one.
14. $\Delta^{1,3,5(10)}$-19-nor-pregnatriene-17α,21-diol-11,20-dione.
15. 16α-methyl-$\Delta^{1,3,5(10)}$-19-nor-pregnatriene-11β,17α,21-triol-20-one.
16. 16α,17α-isopropylidenedioxy-$\Delta^{1,3,5(10)}$-19-nor-pregnatriene-11β,21-diol-20-one.
17. 6α-methyl-$\Delta^{1,3,5(10)}$-19-nor-pregnatriene-11β,17α,21-triol-20-one.
18. 6α,16α-dimethyl-$\Delta^{1,3,5(10)}$-19-nor-pregnatriene-11β,17α,21-triol-20-one.
19. $\Delta^{1,3,5(10)}$-19-nor-pregnatriene-11β,21-diol-20-one.

No references cited.